(12) United States Patent
Bucher et al.

(10) Patent No.: US 11,742,749 B2
(45) Date of Patent: Aug. 29, 2023

(54) DEVICE AND METHOD FOR DISCHARGING A DC LINK CAPACITOR, POWER CONVERTER AND VEHICLE

(71) Applicant: Valeo Siemens eAutomotive Germany GmbH, Erlangen (DE)

(72) Inventors: Alexander Bucher, Nuremberg (DE); Alexander Pawellek, Erlangen (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 17/278,562

(22) PCT Filed: Oct. 9, 2019

(86) PCT No.: PCT/EP2019/077345
§ 371 (c)(1),
(2) Date: Mar. 22, 2021

(87) PCT Pub. No.: WO2020/074575
PCT Pub. Date: Apr. 16, 2020

(65) Prior Publication Data
US 2021/0359591 A1 Nov. 18, 2021

(30) Foreign Application Priority Data
Oct. 12, 2018 (DE) .................... 10 2018 125 272.2

(51) Int. Cl.
*H02M 1/32* (2007.01)
*H02M 3/155* (2006.01)
(52) U.S. Cl.
CPC .......... *H02M 1/322* (2021.05); *H02M 3/155* (2013.01)
(58) Field of Classification Search
CPC .... H02M 1/0025; H02M 1/0029; H02M 1/32; H02M 1/322; H02M 1/36; H02M 3/155;
(Continued)

(56) References Cited

U.S. PATENT DOCUMENTS 4,331,994 A * 5/1982 Wirth .................... H02H 3/445
363/55
5,619,107 A 4/1997 Shinohara et al.
(Continued)

FOREIGN PATENT DOCUMENTS

| DE | 102017103967 A1 | 9/2017 |
| EP | 2284982 A1 | 2/2011 |
| JP | 2012-120436 A | 6/2012 |

OTHER PUBLICATIONS

PCT/ISA/210, "International Search Report for International Application No. PCT/EP2019/077345," dated Feb. 18, 2020.

*Primary Examiner* — Thienvu V Tran
*Assistant Examiner* — Carlos O Rivera-Perez
(74) *Attorney, Agent, or Firm* — Manabu Kanesaka (57) ABSTRACT

A device for discharging a DC link capacitor includes a discharge device which is connected in parallel with the DC link capacitor and by which, on receipt of a discharge signal requesting discharge, a current flow can be generated which, in the presence of a first signal state of a control signal, has a lower current intensity than in the presence of a second signal state of the control signal; a voltage detection device by which a voltage signal describing a capacitor voltage dropping across the intermediate circuit capacitor can be generated; and a control device with a signal generating unit which is arranged to generate a reference signal whose value at the time of receipt of the discharge signal is dependent on the voltage signal and is reduced relative to the voltage signal, and a comparison unit which is arranged to compare the voltage signal with the reference signal.

14 Claims, 8 Drawing Sheets

(58) Field of Classification Search
CPC .......... H02M 3/156; H02M 7/42; H02M 7/44;
H02M 7/48; H02M 7/515; H02M 7/5152;
H02M 7/537; H02M 7/5387; H02J
7/0026; H02J 7/0031; H02J 7/00306
USPC ........ 323/222–226, 266, 271–276, 279–285,
323/289, 311–313, 351; 320/129–132,
320/134–136, 166, 167
See application file for complete search history.

(56) References Cited

U.S. PATENT DOCUMENTS

| | | |
|---|---|---|
| 8,686,694 B2 | 4/2014 | Funaba et al. |
| 9,985,453 B2 | 5/2018 | Namou et al. |
| 2010/0323766 A1* | 12/2010 | Bohne .................... H04B 1/04 455/572 |
| 2016/0226386 A1* | 8/2016 | Fukuta .................... B60L 50/60 |

* cited by examiner

DEVICE AND METHOD FOR DISCHARGING A DC LINK CAPACITOR, POWER CONVERTER AND VEHICLE

RELATED APPLICATIONS

The present application is National Phase of International Application No. PCT/EP2019/077345 filed Oct. 9, 2019, and claims priority from German Application No. DE 10 2018 125 272.2 filed Oct. 12, 2018, the disclosure of which is hereby incorporated by reference herein in its entirety.

The present invention relates to a device for discharging a DC link capacitor, comprising a discharging device connected in parallel with the DC link capacitor, by means of which, on receipt of a discharge signal requesting discharge, a current flow can be generated which has a lower current intensity in the presence of a first signal state of a control signal than in the presence of a second signal state of the control signal, and a voltage detection device by means of which a voltage signal describing a capacitor voltage dropping across the DC link capacitor can be generated.

In addition, the invention relates to a power converter, a vehicle and a method for discharging a DC link capacitor.

Electrically driven vehicles of higher power typically have a high-voltage vehicle electrical system that is fed from a DC voltage source such as a high-voltage battery. High-voltage components connected to the high-voltage vehicle electrical system, in particular power converters, include a DC link capacitor that stores a significant amount of electrical energy when charged. In the event of a safety-relevant fault, such as a pilot line interruption, an accident or an insulation fault, strict requirements are placed on the discharge time to be observed; for example, a discharge time of 2 seconds is required. It is generally assumed that the fault causes proper galvanic isolation of the DC voltage source of the high-voltage vehicle electrical system from the high-voltage component.

In addition to this single fault case, however, a double fault case must also be taken into account in which, in addition, the galvanic isolation of the DC voltage source does not take place, only takes place with a delay or is cancelled again during discharging, for example due to faulty control of an isolating device between the DC voltage source and the high-voltage component or "hanging" mechanical contacts of the isolating device. If, in such a double fault case, a discharge device connected in parallel to the DC link capacitor is controlled for discharging, it does not discharge the capacitor, but the current flowing through it is provided entirely by the DC voltage source. The resulting thermal power loss can damage or destroy the discharge device. Sufficient protection against thermal overload is therefore required in the event of the double fault.

Document EP 2 284 982 A1 discloses a discharge circuit for a smoothing capacitor used in a power conversion device. The discharge circuit includes a resistor that discharges charge from the capacitor, a switch connected in series with the resistor, a measurement circuit that measures a terminal voltage of the capacitor, and a control circuit that controls whether the switch conducts or blocks. After driving the switch to conduct and begin discharging the capacitor across the resistor, the control circuit drives the switch to block and stop discharging across the resistor when the terminal voltage of the capacitor measured by the sensing circuit exceeds a predetermined voltage reduction characteristic. To accelerate discharge, the resistor includes a first resistor having a first resistance value and a second resistor having a second resistance value less than the first resistance value. The switch includes a switch connected in series with the first resistor and a switch connected in series with the second resistor. The control device starts discharging the capacitor through the first resistor. When the measured terminal voltage reaches a predetermined voltage or less, the control device starts discharging the capacitor through the second resistor in addition to the first resistor. The predetermined voltage is an average of a maximum discharge voltage and a target discharge voltage.

The object of the invention is to provide a more robust possibility for discharging a DC link capacitor.

In order to solve this problem, according to the invention a device of the type mentioned above is proposed, further comprising a control device having a signal generation unit which is arranged to generate a reference signal whose value at the time of receipt of the discharge signal is dependent on the voltage signal and is reduced relative to the voltage signal, and a comparison unit which is set up to compare the voltage signal with the reference signal, to provide the control signal with the first signal state when the discharge signal is received, and to provide the control signal with the second signal state when the value of the voltage signal reaches or falls below the value of the reference signal.

The invention is based on the idea of initially setting a low current flow through the discharge device, checking whether the DC link capacitor is actually discharged by comparing the voltage signal with the reference signal lying below the voltage signal and, if this is the case, setting a higher current flow for discharging the DC link capacitor. If it is not possible to discharge the DC link capacitor, which can be concluded from the fact that the voltage signal does not reach or falls below the reference signal which is lower than it, the current flow through the discharging device merely has the lower current intensity, whereby the thermal power loss in the discharging device can be limited.

Advantageously, the device according to the invention thus has inherent self-protection because it provides only a small current flow through the discharge device in the event of a double fault condition, which includes tripping of the discharge signal and failure to disconnect the DC link capacitor from a DC voltage source. This enables robust operation of the device by providing multiple discharge rates dependent on the dischargeability of the DC link capacitor. At the same time, the complex, microcontroller-based determination of a voltage reduction characteristic, as known in the prior art, can be dispensed with.

It is expedient to select the current intensity when the first signal state of the control signal is present so that the discharge device can be operated without damage even when a maximum voltage of a voltage source feeding the DC link capacitor is applied. It is generally preferred if the signal generation unit and/or the comparison unit is/are designed as an analog circuit. Advantageously, this eliminates the need for a discrete-time controller, which would require a great deal of effort to achieve a sufficient ASIL level for automotive applications. The comparison unit preferably has a comparator which is set up to compare the reference signal with the voltage signal. The voltage detection device is expediently a voltage divider which can be connected in parallel with the DC link capacitor and at whose tap the voltage signal can be made available. The voltage detection device does not have to be provided specifically for discharging the DC link capacitor; it is also possible for the voltage signal to be made available by means of the voltage detection device for other components of a converter having the device according to the invention.

In the device according to the invention, the comparison unit is preferably set up to change from the second signal state to the first signal state when the value of the voltage signal reaches or exceeds the value of the reference signal. This allows a possibly temporary return to the current flow with the lower amperage if the DC link capacitor should unexpectedly be reconnected to the DC voltage source, causing an abrupt increase of the capacitor voltage.

Particularly preferably, the signal generation unit is set up to increase the value of the reference signal to a reduced value compared to the value of the voltage signal when the voltage signal exceeds the value of the reference signal. In this way, it can be ensured that after the value of the reference signal has been exceeded, in particular in the case of the unexpected connection of the DC voltage source to the DC link capacitor mentioned above, a check can be made again for the dischargeability of the DC link capacitor if, for example, the connection to the DC voltage source is subsequently dropped again.

The signal generation unit is conveniently set up to preset a voltage curve of the reference signal in such a way that its value falls more slowly than the value of the voltage signal when the DC link capacitor is discharged.

In the device according to the invention, it can advantageously be provided that the voltage detection device has an output at which a voltage representing the voltage signal can be made available, the signal generation device having a voltage reduction element and an energy storage element which are connected in series, the voltage reduction element being connected to the output of the voltage detection device, the output of the voltage detection device being connected to a first input of the comparison unit, and a potential between the voltage reduction element and the energy storage element being connected to a second input of the comparison unit. This enables a particularly simple circuit design of the signal generation unit. Expediently, the first input of the comparison unit is a negative input and the second input of the comparison unit is a positive input.

The voltage reduction element is preferably a diode. The diode can be connected with its anode to the output of the voltage detection device and with its cathode to the energy storage element. The diode preferably realizes, through its forward voltage, the reduction of the value of the reference signal with respect to the voltage signal. Furthermore, the diode allows the energy storage element to be recharged to a differential value between the voltage signal and the forward voltage when the voltage signal increases. Alternatively, the voltage reduction element may be a resistor. The energy storage element is preferably an RC element, and a capacitor and a resistor of the RC element may be connected in parallel to the second input of the comparison unit.

With regard to the discharge device, it is preferred in the device according to the invention if the discharge device has a series circuit comprising a resistor unit and a transistor unit. In this context, it is convenient if a resistance value of the resistance unit can be changed as a function of the control signal. In this way, the different current strengths can be realized when the first or second signal state is present.

In principle, it is possible that the transistor unit is set up to switch as a function of the discharge signal. Then there is an exponential course of the current flow and the capacitor voltage when the DC link capacitor is discharged. Consequently, the energy stored in the DC link capacitor is essentially converted into heat in the resistor unit. The resistor unit should be dimensioned and/or deheated in accordance with any power loss that arises in the process.

However, it is preferred if the transistor unit forms a longitudinal element of a current sink which can be controlled as a function of the control signal. The transistor unit can thus be operated in its active range as a function of the control signal in order to keep the current flow through the discharge device constant. Then the capacitor voltage decreases linearly when the DC link capacitor is discharged. The advantage of discharging with a substantially constant current flow over discharging with the current flow decreasing exponentially can be seen in a lower discharge power at the beginning of the discharge process. In this case, the discharge power is also converted into heat by the transistor unit, which advantageously allows expensive high-power resistor components, in particular cement resistors, to be dispensed with in the resistor unit.

According to a preferred embodiment, the current sink comprises a voltage regulator unit with a cathode, an anode and a reference terminal, wherein the cathode is connected to a control terminal of the transistor unit and the reference terminal is connected to a potential between the transistor unit and the resistor unit. The voltage regulator unit may include an operational amplifier, a reference voltage source, and a transistor as a longitudinal element between the anode and the cathode.

According to an alternative embodiment, the current sink comprises an operational amplifier, an output of the operational amplifier being connected to a control terminal of the transistor unit a first input of the operational amplifier being connected to a reference potential between the resistor unit and the transistor unit, a voltage at a second input of the operational amplifier being variable in dependence on the control signal. The first input is suitably the negative input of the operational amplifier and the second input is the positive input of the operational amplifier. In order to change the voltage at the second input, it is preferred if the comparison unit, in particular its comparator, has an open-collector terminal with a downstream resistor and the current sink has an operating voltage which is connected to a voltage divider, a tap of the voltage divider and the resistor of the comparison unit being connected to the second terminal of the operational amplifier. By means of the voltage divider, a setpoint value of the current sink can be preset.

Preferably, the device also has a feedback device by means of which the or a setpoint value of the current sink can be controlled as a function of the voltage signal. This means that instead of a constant discharge current, a discharge current can be provided which increases as the capacitor voltage falls, since an image of the capacitor voltage is fed back for current control. The discharge power then does not fall linearly as in the case of discharge with constant current, but is much more uniform at the start of the discharge process. As a result, a peak value of the discharge power can be lowered, which enables the use of less expensive components.

Preferably, the feedback device has a current sink which can be controlled as a function of the voltage signal and by means of which the voltage at the second input of the comparator of the discharge device can be varied.

It is further preferred in the device according to the invention if the transistor unit has a plurality of transistors, each comprising a control terminal by means of which a current flow between two further terminals of the transistor can be controlled, a first terminal of a resistor being connected to a respective further terminal on the resistor unit side and second terminals of the resistors being connected together.

In this way, even higher amounts of energy stored in the DC link capacitor according to the relationship $E=\frac{1}{2} \cdot C \cdot U^2$ can be reliably switched or dissipated by the transistor unit. Expediently, the device has means for deheating the transistor unit.

In addition, the invention relates to a power converter for a vehicle, comprising a DC link capacitor and a device according to the invention for discharging the DC link capacitor. The power converter may be an inverter, a DC-DC converter or an active rectifier.

The invention further relates to a vehicle comprising at least one power converter according to the invention. Typically, the vehicle comprises a high-voltage vehicle electrical system with a DC voltage source, in particular a high-voltage battery. A power converter can be an inverter, which is set up to convert a DC voltage provided by the DC voltage source into an AC voltage for an electrical machine at least partially driving the vehicle. A power converter can be a DC/DC converter, in particular for coupling the high-voltage vehicle electrical system to a further vehicle electrical system, in particular a low-voltage vehicle electrical system. A power converter can be an active rectifier, in particular for a charging device for charging the high-voltage battery. The vehicle typically has a disconnection device which is set up to disconnect the DC voltage source from other components of the high-voltage vehicle electrical system, in particular from the at least one power converter, when the discharge signal is received.

Finally, the invention relates to a method for discharging a DC link capacitor, comprising the following steps: Generating a voltage signal describing a capacitor voltage dropping across the DC link capacitor; generating a reference signal whose value at the time of receipt of the discharge signal is dependent on the voltage signal and is reduced relative to the voltage signal; comparing the voltage signal with the reference signal; providing a control signal having a first signal state upon receipt of the discharge signal for providing the control signal having a second signal state when the value of the voltage signal equals or falls below the value of the reference signal; and generating a current flow through a discharge means connected in parallel with the DC link capacitor, the current flow having a lower current intensity when the first signal state of the control signal is present than when the second signal state of the control signal is present.

All the explanations concerning the device according to the invention can be applied analogously to the converter according to the invention, the vehicle according to the invention and the process according to the invention, so that the advantages mentioned above can also be achieved with these.

Figure 1:
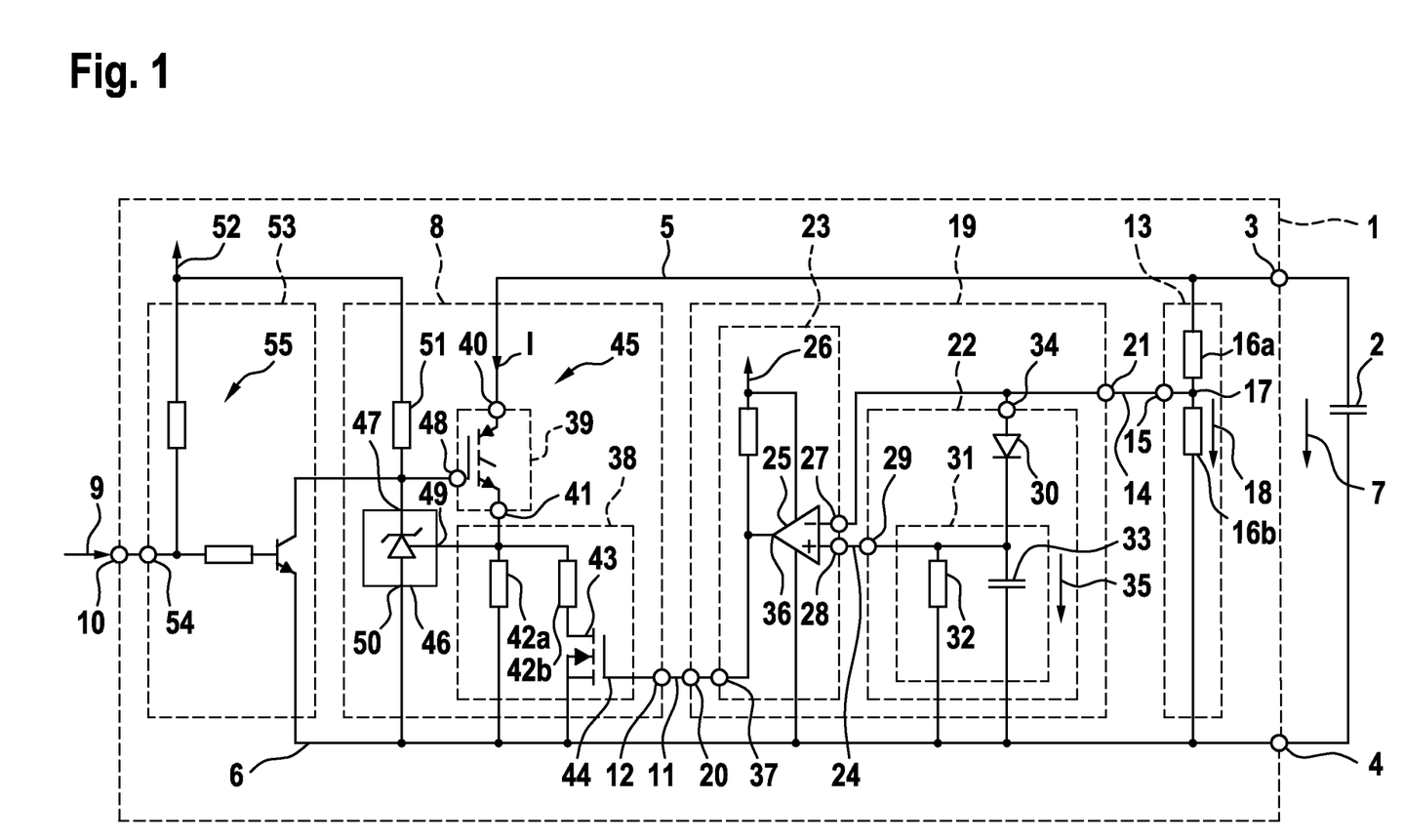
FIG. 1 a circuit diagram of a first embodiment of the device according to the invention.

Further details and advantages of the present invention will be apparent from the embodiments described below and from the drawings. These are schematic representations and show:

FIG. 1 is a circuit diagram of a first embodiment of a device 1 for discharging a DC link capacitor 2.

The DC link capacitor 2 is connected to a first terminal 3 and to a second terminal 4 of the device 1, so that a capacitor voltage 7 dropping across the DC link capacitor 2 is present between a first line 5 having a high potential connected to the first terminal 3 and a second line 6 having a low potential of the device 1 connected to the second terminal 4.

The device 1 comprises a discharge device 8 connected in parallel with the DC link capacitor 2, by means of which a current flow I can be generated through the discharge device 8 when a discharge signal 9 requesting discharge is received at a third input 10 of the device 1. The current flow has a lower current intensity when a first signal state of a control signal 11 is present at an input 12 of the discharge device 8 than when a second signal state of the control signal 11 is present.

The device 1 also comprises a voltage detection device 13, by means of which a voltage signal 14 describing the capacitor voltage 7 can be generated at an output 15. The voltage detection device 13 is designed as a voltage divider with two resistor elements 16a, 16b. A voltage 18 representing the voltage signal 14 is applied to a tap 17 of the voltage divider forming the output 15.

The device 1 further comprises a control device 19, by means of which the control signal 11 can be provided to the discharge device 8 at an output 20 as a function of the voltage signal 14 applied to an input 21 of the control device 19. For this purpose, the control device 19 comprises a signal generation unit 22 and a comparison unit 23.

The signal generating unit 22 is arranged to generate a reference signal 24 whose value is dependent on the voltage signal 14 and is reduced relative thereto at the time the discharge signal 9 is received. The comparison unit 23 is arranged to compare the voltage signal 14 with the reference signal 24 and to provide the control signal 11 with the first signal state, and to provide the control signal 11 with the second signal state when the value of the voltage signal 14 reaches or falls below the value of the reference signal 24. The comparison unit 23 is further adapted to change from the second signal state to the first signal state when the value of the voltage signal 14 again reaches or exceeds the value of the reference signal 24.

For this purpose, the comparison unit 23 has a comparator 25 whose negative input corresponds to an input 27 of the comparison unit 23 and whose positive input corresponds to a second input 28 of the comparison unit 23. The comparator 25 can be operated by means of an operating voltage 26. The voltage signal 14 is present at the first input 27 of the comparison unit 23, in that the voltage detection device 13 is connected to the first input 27. The reference signal 24 is present at the second input 28 of the comparator unit 23 in that an output 29 of the signal generating device 22, in the present embodiment example directly, is connected to the second input 28 of the comparator unit 23.

The signal generating unit 22 is adapted to increase the value of the reference signal 24 to a value reduced with respect to the voltage signal 14 when the voltage signal 14 exceeds the value of the reference signal 24. In addition, the signal generating unit 22 is adapted to preset the voltage waveform of the reference signal 24 such that its value falls more slowly than the value of the voltage signal 14 when the DC link capacitor 2 is discharged.

For this purpose, the signal generating device 22 comprises a voltage reducing element 30, which is realized by a diode, and an energy storage element 31, which in the present case is formed as an RC element from a resistor 32 and a capacitor 33. The signal generating device 22 has an input 34 connected to the output 15 of the voltage detecting device 13. Internally, the voltage reducing element 30 is connected to the input 34 by connecting an anode of the diode to the input 34 and a cathode of the diode to the energy storage element 31. The voltage reducing element 30 reduces the voltage 18 by the forward voltage of the diode to a voltage 35, which is applied to the energy storage element 31. In a steady state, the capacitor 33 is thus charged to this value.

If the DC link capacitor 2 is discharged, the capacitor voltage 7 and thus the voltage 18 representing the voltage signal 14 drops faster than the capacitor 33 discharges via the resistor 32. For this purpose, the resistance value of the resistor 32 and the capacitance value of the capacitor 33 are selected in such a way that the reference signal 24 decreases more slowly than the voltage signal 14.

Thus, at an output 36 of the comparator, which also forms an output 37 of the comparison unit 23, the first signal state is present before and upon receipt of the discharge signal when the DC link capacitor 2 and the capacitor 33 are stationarily charged, because the value of the voltage signal 14 is greater than the value of the reference signal 24. When the DC link capacitor 2 is discharged after receiving the discharge signal 9, the value of the voltage signal 14 decreases until it reaches and falls below the value of the reference signal 24. Consequently, the comparison unit 23 outputs the second signal state at the output 37. When the capacitor voltage 7 increases, the energy storage element 31 is recharged via the diode 30, so that the voltage conditions at the comparison unit 23 are reversed and the first signal state is again present at the output 37.

The discharge device 8 comprises a series circuit of a resistor unit 38 and a transistor unit 39, wherein a first terminal 40 of the transistor unit 39 is connected to the first line 5 and a second terminal 41 of the transistor unit 39 is connected to the resistor unit 38. In the present embodiment, the transistor unit 39 is formed by an insulated gate bipolar transistor (IGBT).

A resistance value of the resistor unit 38 can be changed as a function of the control signal 11. For this purpose, the resistor unit 38 comprises a first resistor element 42a and a series circuit connected in parallel thereto and consisting of a second resistor element 42b and a switching element 43, here exemplarily in the form of a field-effect transistor with insulated gate. A control terminal 44 of the switching element 43 forms the input 12 of the discharge device 8. Consequently, the switching element 43 switches the second resistance element 42b in parallel with the first resistance element 42a as a function of the signal state of the control signal 11, resulting in a lower resistance value of the resistance unit 38 than when the switching element 43 is blocked.

The transistor unit 39 further forms a longitudinal element of a current sink 45. For this purpose, the current sink 45 comprises a voltage regulator unit 46 implemented by a TL431 type device. For this purpose, a cathode 47 of the voltage regulator unit 46 is connected to a control terminal 48 of the transistor unit 39. A reference terminal 49 of the voltage regulator unit 46 is connected to a potential between the transistor unit 39 and the resistor unit 38. An anode 50 of the voltage regulator unit 46 is connected to the second line 6. The control terminal 48 of the transistor unit 39 is further connected to an operating voltage 52 of the device 1 via a resistor 51.

If the first signal state is present at the input 12 of the discharge device 8, the switching element 43 blocks so that the resistance value of the resistance unit 38 is high, which is why the voltage regulator unit 46 regulates the current flow I through the discharge device 8 to a low value. If, on the other hand, the second signal state is applied to the input 12, the resistance value of the resistance unit 38 is low, so that the voltage regulator unit 46 regulates the current flow I through the discharge device 8 to a high value.

The device 1 further comprises an activating device 53, the input 54 of which forms the input 10 of the device 1. The activation device 53 comprises a transistor circuit 55 which is arranged to switch the control terminal 48 of the transistor unit 38 to the ground potential of the line 6 when a high level is present at the input 10, so that the transistor unit 39 blocks and no current flow I occurs. On the other hand, if the discharge signal 9 represented by a low level is present at the input 10, the transistor circuit 55 blocks and the charging current I flows in response to the control signal 11.

Figure 2:
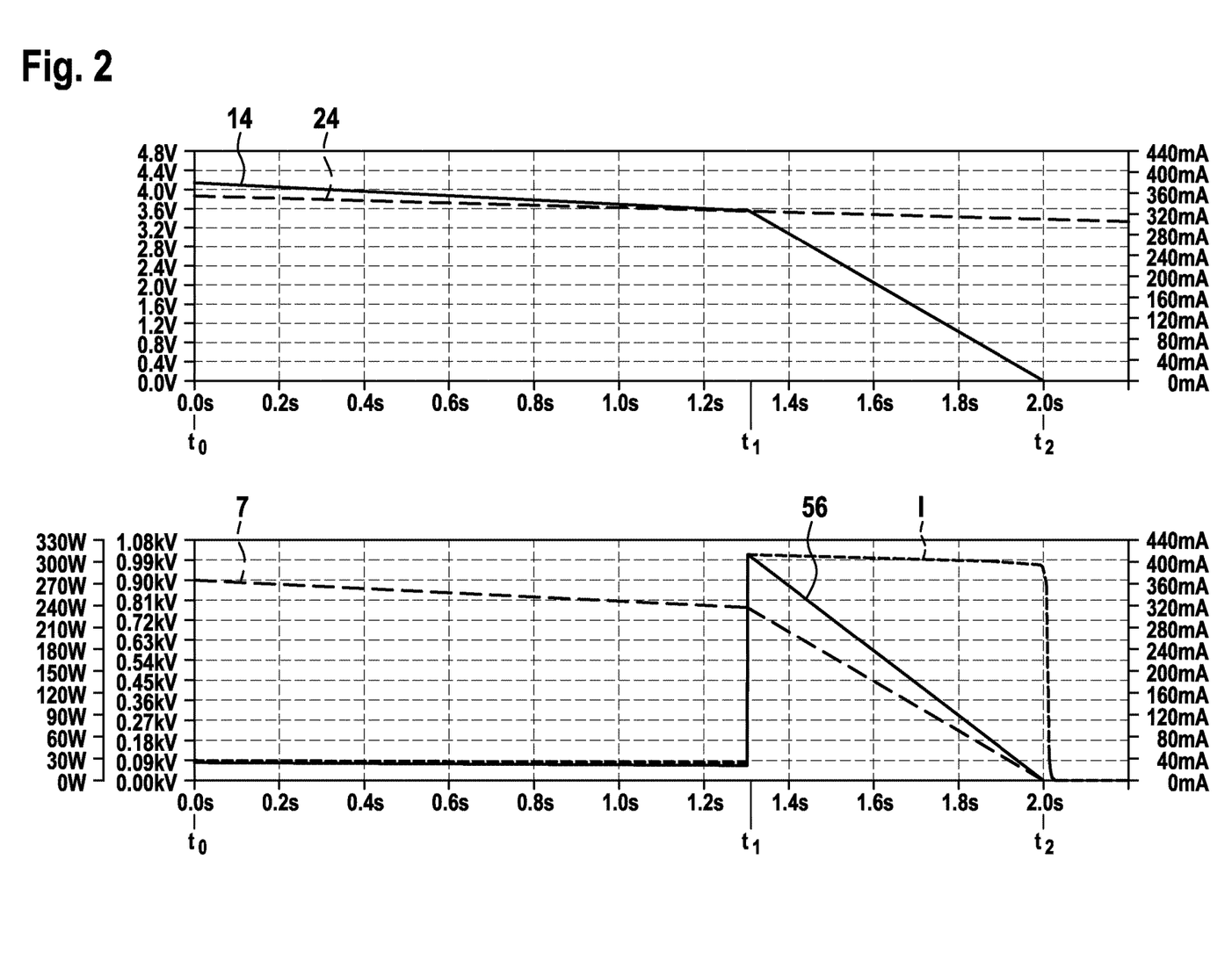
FIGS. 2 to 4 each show time curves of electrical variables in different operating cases of the device shown in FIG. 1.

FIG. 2 shows time courses of electrical variables in a first operating case of the device 1, with an upper diagram showing the course of the voltage signal 14 and the course of the reference signal 24 and a lower diagram showing courses of the capacitor voltage 7, the current flow I and a resulting discharge power 56, which is converted in the transistor unit 39 and the resistor unit 38.

FIG. 2 is based on the following exemplary configuration of device 1. DC link capacitor 2: 370 µF; resistor 16a: 89.7 kΩ; resistor 16b: 415Ω; voltage reducing element 30: diode 1N4148; resistor 32: 1.5 MΩ; capacitor 33: 10 µF; comparator 25: comparator LM2903; operating voltage 26: 5 V; resistor 42a: 94Ω; resistor 42b: 6.6Ω; supply voltage 52: 15 V.

Before a time to, the DC link capacitor 2 is stationary charged with a voltage of 900 V. At a time to, the device 1 receives the discharge signal 9 requesting the discharge of the DC link capacitor 2. As a result, the current flow I starts and the first signal state of the control signal 11 is present at the input 12 of the discharge device 8, so that only a small discharge current I of about 40 mA flows through the discharge device 8. At a time $t_1$, the value of the voltage signal 14 has fallen below the value of the reference signal 24, so that the second signal state of the control signal 11 is present at the input 12 and the current flow I increases abruptly to a value of about 400 mA and remains essentially constant until a time $t_2$ at which the DC link capacitor 2 is completely discharged.

Consequently, the comparison unit 23 uses the low current strength to check whether the DC link capacitor 2 is discharging, i.e. whether the voltage signal 14 is dropping faster than the reference signal 24. Only if this is the case is the higher current strength of the current flow I enabled. Between the times $t_0$ and $t_1$, i.e. when the first signal state is present, the current intensity is selected in such a way that it can also be led through the discharge device 8 permanently without damage, whereas the current intensity which is almost ten times as large between the times $t_1$ and $t_2$ is only released when it is ensured that the DC link capacitor 2 can be discharged, i.e. no voltage source is connected to it. It should be noted that the reference signal 24 is always defined below the voltage signal 14 because of the voltage reduction element 30, even at a different, in particular lower, capacitor voltage 7, so that the previously described check for dischargeability is ensured in a wide range of values of the capacitor voltage 7 typical for the operation of the DC link capacitor 2.

Figure 3:
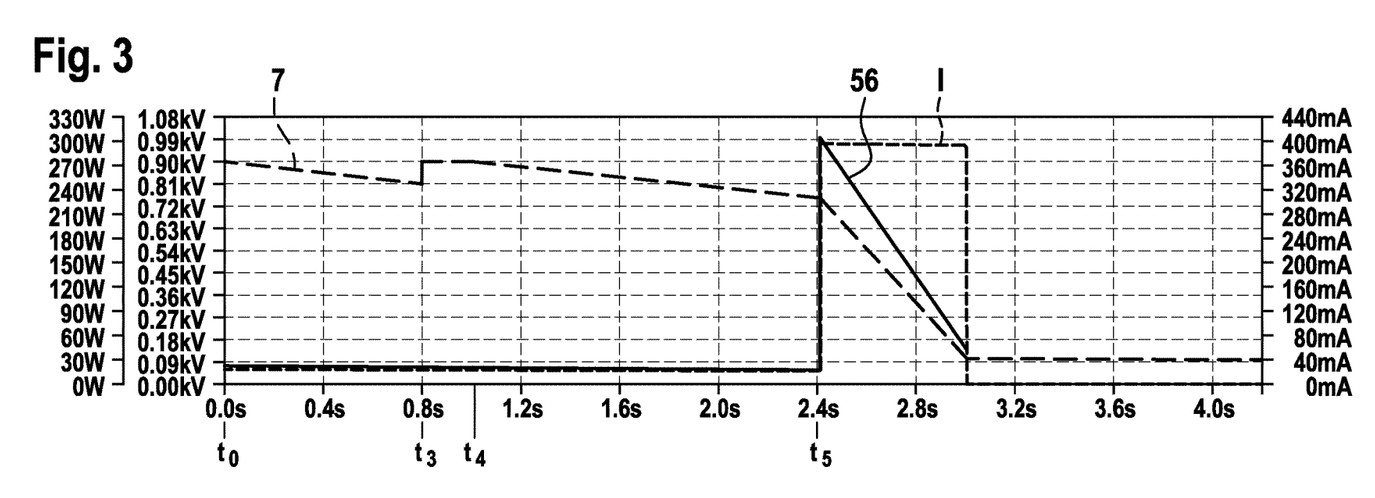

FIG. 3 shows time characteristics of the capacitor voltage 7, the current flow I and the discharge power 56 in a further operating case of the device 1. Here, the capacitor voltage 7 rises at a time $t_3$, for example because a DC voltage source was unexpectedly connected to the DC link capacitor 2, and falls again from a time $t_4$ because the DC voltage source was disconnected from the DC link capacitor 2 again. At time $t_3$, however, discharge was still taking place with the low current intensity of the current flow I. Consequently, there is no release of the increased current intensity until a time $t_5$, because the energy storage element 31 is recharged at time $t_3$ via the diode forming the voltage reduction element 30.

Figure 4:
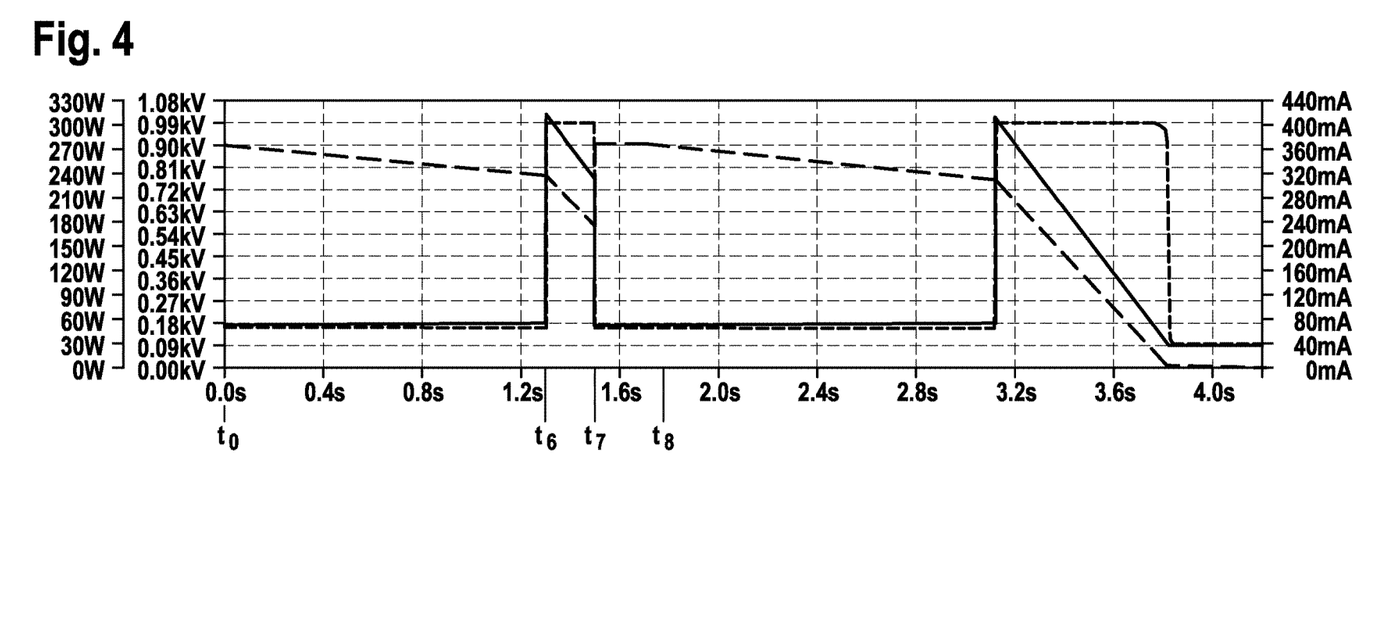

FIG. 4 shows time characteristics of the capacitor voltage 7, the current flow I and the discharge power 56 in a further operating case of the device 1. Here, at a time $t_6$, the higher current intensity of the current flow I is released, after which, however, the capacitor voltage 7 rises at a time $t_7$ analogous to the time $t_3$ in FIG. 3. From a time $t_8$, the capacitor voltage 7 falls again analogously to the time $t_4$ in FIG. 3. Obviously, the current flow I with the high current intensity is also terminated immediately when it is determined that the DC link capacitor 2 can no longer be discharged.

Figure 5:
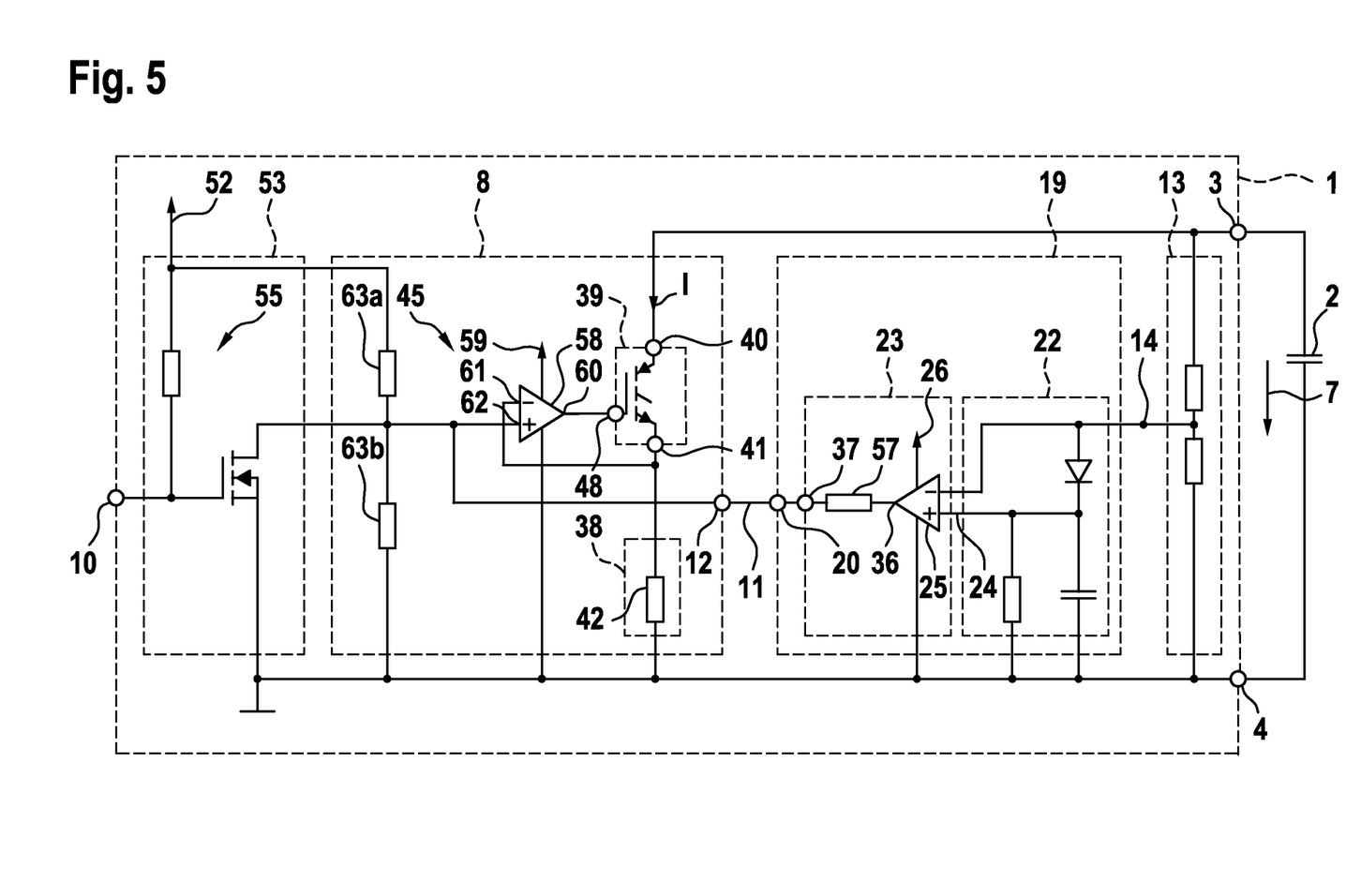
FIG. 5 a circuit diagram of a second embodiment of the device according to the invention.

FIG. 5 is a circuit diagram of a second embodiment of a device 1 which corresponds to that shown in FIG. 1 except for the deviations described below. Identical or similarly acting components are marked with identical reference signs.

The voltage detection device 13 and the signal generation device 22 are configured identically to the first embodiment. The comparator unit 23 includes a resistor 57 between its output and the output 36 of the comparator 25, which is an open-collector output.

In the discharge device 8, the resistance unit 38 is formed by a resistance element 42 having a fixed resistance value. Instead of the voltage control unit 46, an operational amplifier 58 is provided which is operable by means of an operating voltage 59. An output 60 of the operational amplifier 58 is connected to the control terminal 48 of the transistor unit 39. A negative first input 61 of the operational amplifier 58 is connected to a reference potential between the resistor unit 38 and the transistor unit 39. A positive second input 62 of the operational amplifier 58 is connected to the output 20 of the control device 19 via the input 12 of the discharge device 8. Thereby, a reference voltage of the operational amplifier 58 is changed via the resistor 57 in order to change the current intensity of the current flow I. Two resistor elements 63a and 63b divide the operating voltage 52 to provide the reference voltage, which serves as the set point of the current sink 45 and is supplied to the second input 62 of the operational amplifier 58.

In this embodiment, the transistor circuit 55 of the activation device 53 is based on an insulated gate field effect transistor, which can also be applied to the other embodiments, and is connected to the second input 62 of the operational amplifier 58.

Figure 6:
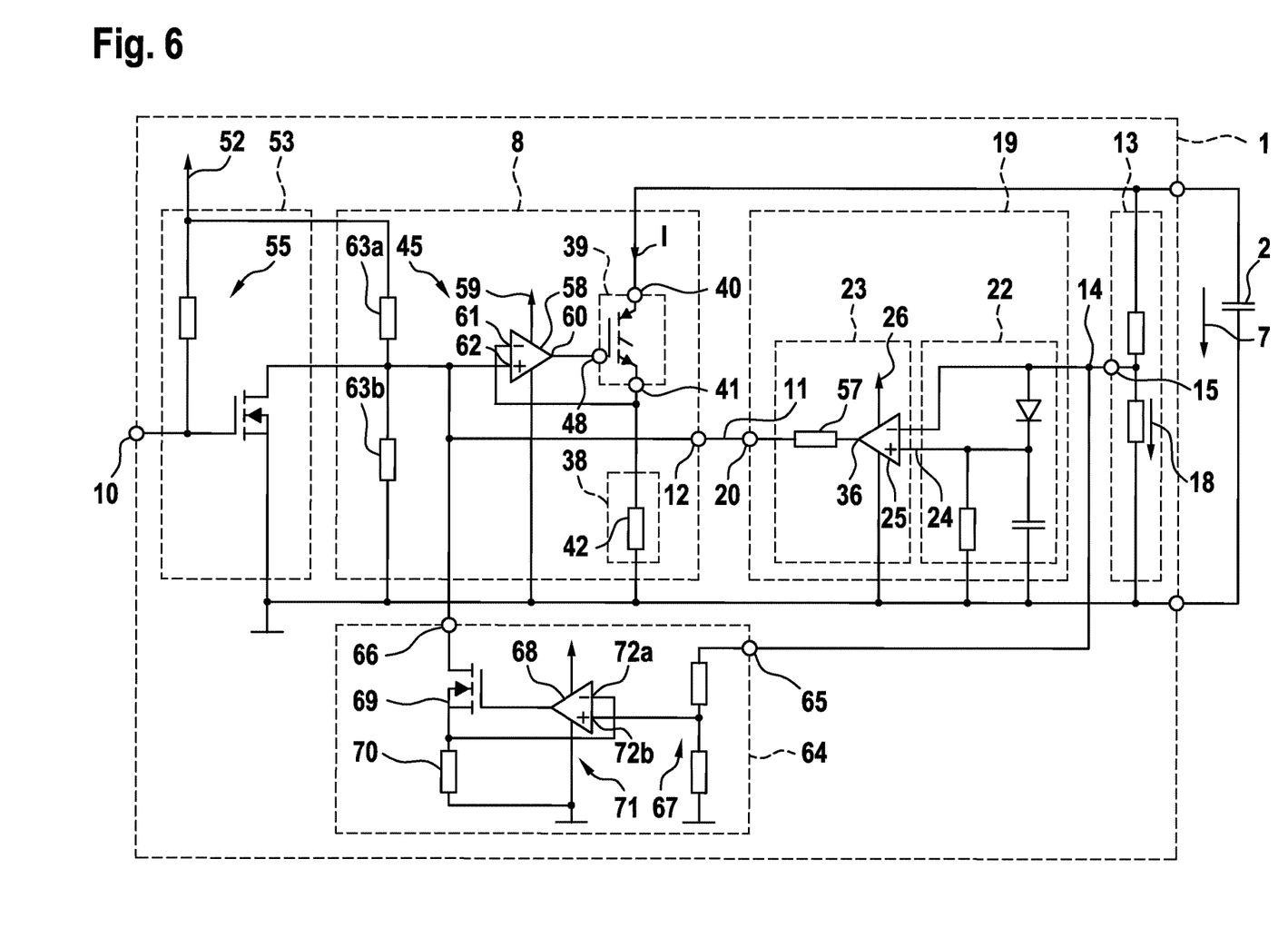
FIG. 6 a circuit diagram of a third embodiment of the device according to the invention.

FIG. 6 is a circuit diagram of a further embodiment of a device 1 which corresponds to that shown in FIG. 5 and additionally has a feedback device 64 by means of which the setpoint of the current sink 45 can be controlled as a function of the voltage signal 14.

The feedback device 64 comprises an input 65 connected to the output 15 of the voltage detection device 13, and an output 66 connected to the second input 62 of the operational amplifier 58. On the input side, the feedback device 64 comprises a voltage divider 67 which reduces the voltage 18 representing the voltage signal 14. A reference voltage for a current sink 71 formed by an operational amplifier 68, a transistor 69 in the form of an insulated gate field effect transistor and a resistive element 70 can be tapped at a tap of the voltage divider 67. Here, a potential between the transistor 69 and the resistance element 70 is connected to a negative first input 72a of the operational amplifier 68, and the tap of the voltage divider 67 is connected to a positive second input 72b of the operational amplifier 68. Thus, the reference voltage at the second input 62 of the operational amplifier 58 is changed as a function of the instantaneous value of the capacitor voltage 7 such that the reference voltage increases as the voltage 7 across the DC link capacitor 2 decreases.

Figure 7:
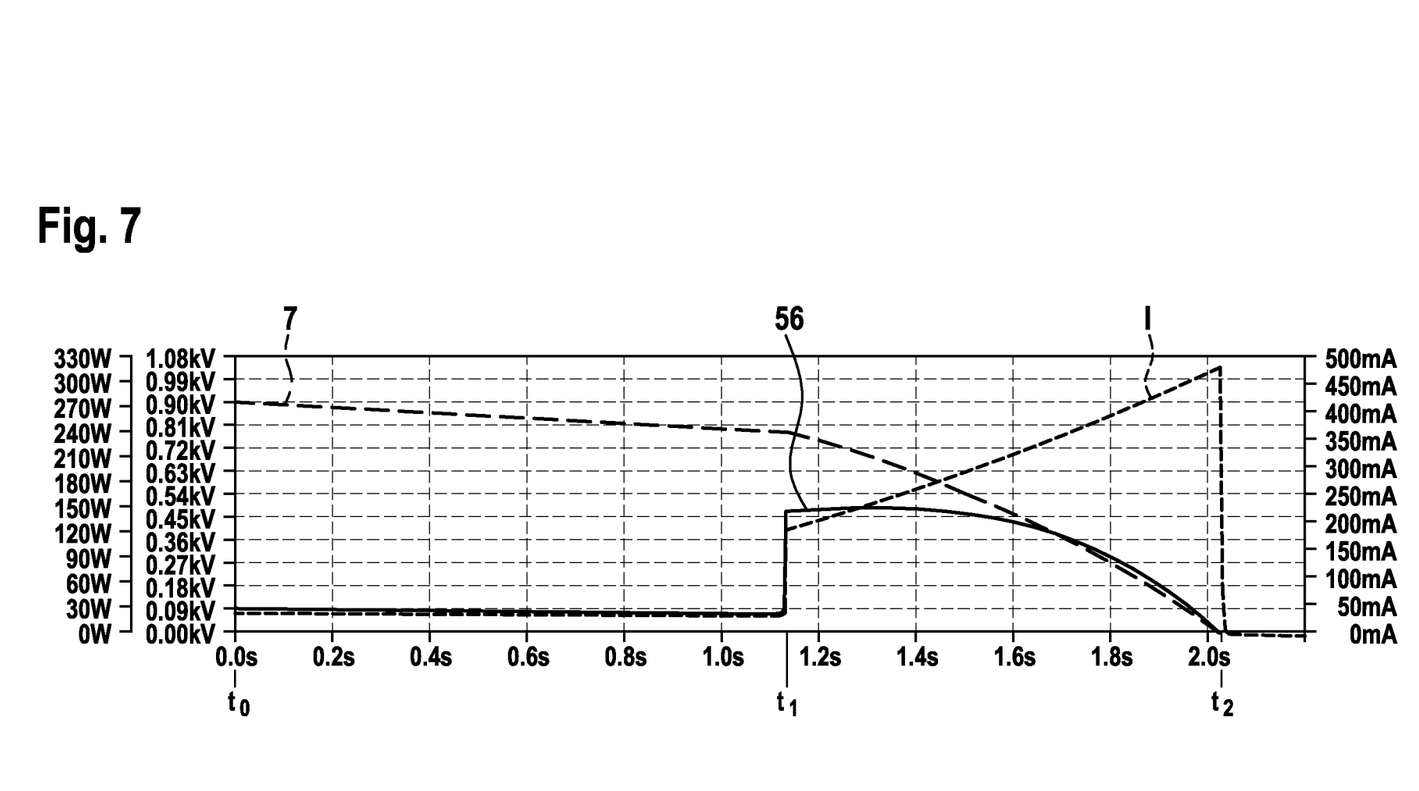
FIG. 7 time characteristics of electrical variables during operation of the device shown in FIG. 6.

FIG. 7 shows time histories of capacitor voltage 7, current flow I, and discharge power 56 in an operating case of device 1 shown in FIG. 6, which is essentially the same as the operating case shown in FIG. 2.

It is evident that the current flow I at time $t_1$ is released with the higher current intensity, although this is not essentially constant, but increases with falling capacitor voltage 7. The course of the capacitor voltage 7 is accordingly exponential of the type $$u_c(t) = U_1 - U_2 \cdot e^{\frac{t}{\tau}}$$

The resulting discharge power 56 avoids the linearly decreasing curve evident in FIGS. 2 to 4, so that a much lower peak power must be converted into heat by the resistor unit 38 and the transistor unit 39. Accordingly, less expensive components with a higher thermal resistance can be used for these components and/or a heat dissipation concept can be simpler.

Figure 8:
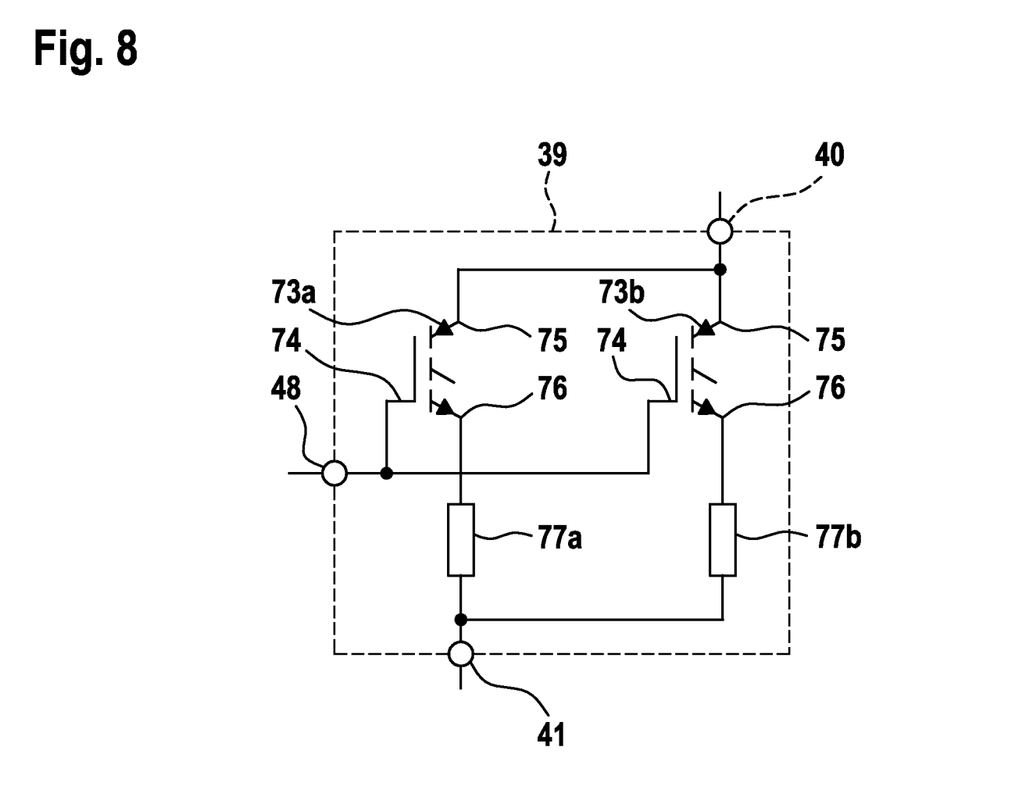
FIG. 8 a circuit diagram of a transistor unit according to further embodiments of the device according to the invention.

FIG. 8 is a circuit diagram of a transistor unit 39 according to further embodiments of a device 1, which may otherwise correspond to the previously described embodiments.

The transistor unit 39 has a plurality of transistors 73a, 73b connected in parallel, each of which is formed as an insulated gate bipolar transistor. In this case, control terminals 74 of the transistors 73a, 73b are connected together with the control terminal 48 of the transistor unit 39, and first terminals 75 of the transistors 73a, 73b are connected together with the first terminal 40. Second terminals 76 are each connected to the second terminal 41 via a resistor 77a, 77b. The transistor unit 39 thus allows a higher amount of energy to be dissipated from the DC link capacitor 2 than a transistor unit constructed by a single transistor. The resistors 77a, 77b force a more even distribution of current through the transistors 73a, 73b.

Figure 9:
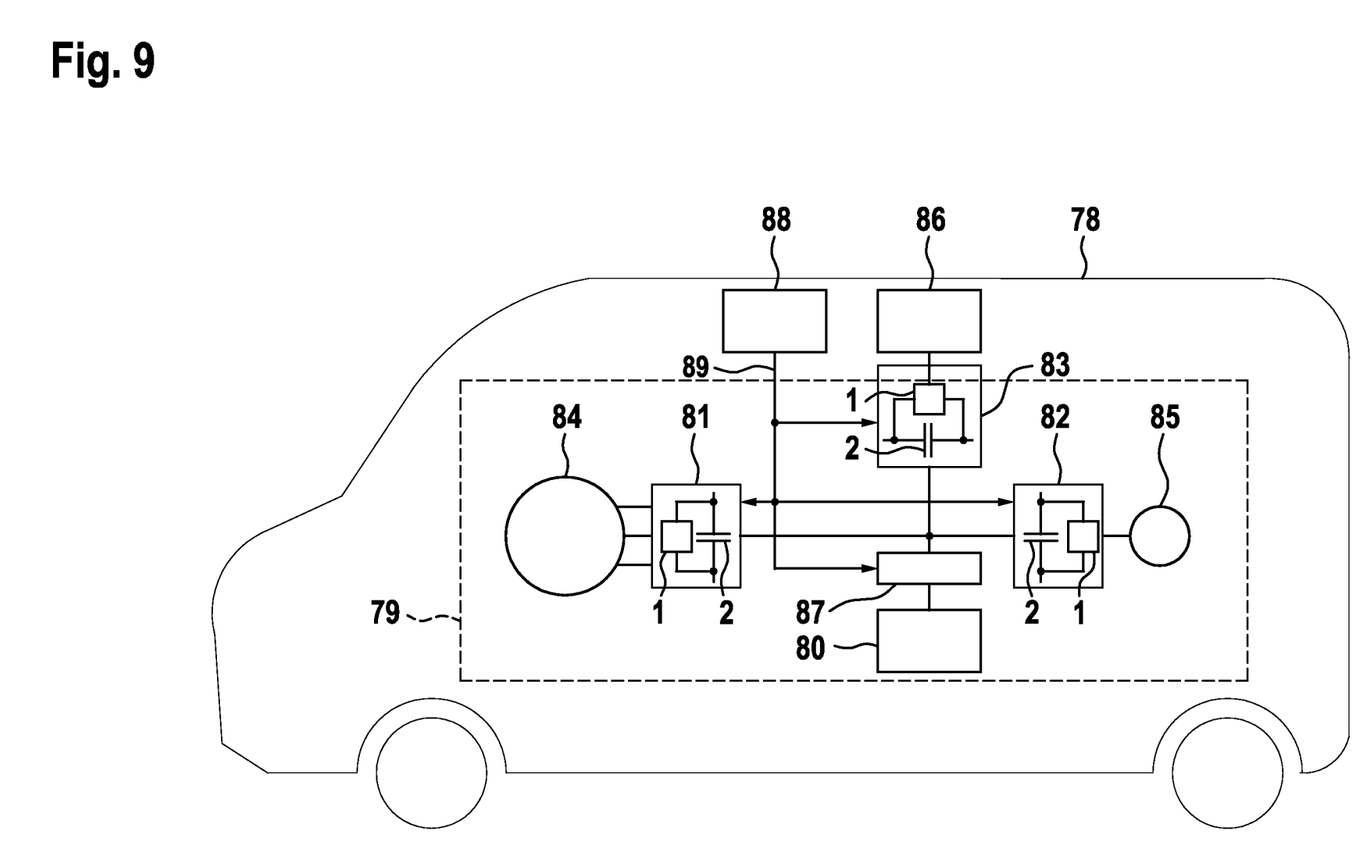
FIG. 9 a principle sketch of an embodiment of the vehicle according to the invention with an embodiment of the converter according to the invention.

FIG. 9 is a schematic sketch of an embodiment of a vehicle 78 with a high-voltage vehicle electrical system 79. The high-voltage vehicle electrical system comprises a DC voltage source 80 in the form of a high-voltage battery and a plurality of power converters 81, 82, 83.

The power converter 81 is an inverter which is arranged to convert a DC voltage provided from the DC voltage source into a three-phase AC voltage for an electric machine 84 driving the vehicle 78 at least partially. The power converter 82 is an active rectifier of a charging device for converting an AC voltage provided at a charging terminal 85 of the vehicle 78 into a DC voltage or current charging the high-voltage battery. The power converter 83 is a DC-DC converter arranged to couple the high-voltage vehicle power system 78 to a low-voltage vehicle power system 86. Each power converter 81, 82, 83 comprises a DC link capacitor 2 on its high-voltage on-board network side, which DC link capacitor 2 is connected to the inputs 3, 4 of a device 1 for discharging the DC link capacitor 2 in accordance with one of the previously described embodiments.

The DC voltage source 80 can be isolated from the other components of the high-voltage vehicle electrical system 79 by means of an isolating device 87. To control the disconnecting device 87, the vehicle 78 has a control unit 88 by means of which a data telegram can be made available via a vehicle bus 89 when a fault is detected. The data telegram controls both the isolating device 87 for isolating the DC voltage source 80 from the other components of the high-voltage vehicle electrical system 79 and the power converters 81, 82, 83 for discharging the DC link capacitors 2. In this case, the power converters 81, 82, 83 are set up to evaluate the data telegram and to generate the discharge signal 9 from the data telegram. Alternatively, the discharge signal 9 can also be fed to the devices 1 of the power converters 81, 82, 83 directly by the control unit 88. In this case, the device 1 permits handling of a double fault case in which the disconnection by the disconnecting device 87 does not take place as intended.

The invention claimed is:

1. A device for discharging a DC link capacitor, comprising:
    a discharge device which is connected in parallel with the DC link capacitor and by means of which, on receipt of a discharge signal requesting discharge, a current flow is generated which, in a presence of a first signal state of a control signal, has a lower current intensity than in a presence of a second signal state of the control signal,
    a voltage detection device by means of which a voltage signal describing a capacitor voltage dropping across the DC link capacitor is generated, the voltage detection device having an output at which a voltage representing the voltage signal is provided, and
    a control device including:
    a signal generating unit which is configured to generate a reference signal having a value at a time of receipt of the discharge signal dependent on the voltage signal and is reduced relative to the voltage signal, the signal generation unit comprising an input, an output, a voltage reduction element and an energy storage element, the input being connected to the output of the voltage detecting device, the energy storage element being connected to the output of the signal generation unit, the voltage reducing element being connected to the input of the signal generation unit and in series with the energy storage element, a potential between the voltage reduction element and the energy storage element being connected to the output of the signal generation unit, the energy storage element having a resistor and a capacitor, a resistance value of the resistor and a capacitance value of the capacitor being chosen such that a value of the reference signal falls more slowly than the value of the voltage signal when discharging the DC link capacitor, and
    a comparison unit having a first input connected to the output of the voltage detection device and a second input connected to the output of the signal generating unit, the comparison unit being configured to compare the voltage signal present at the first input of the comparison unit with the reference signal present at the second input of the comparison unit, to provide the control signal with the first signal state when the discharge signal is received, and to provide the control signal with the second signal state when the value of the voltage signal reaches or falls below the value of the reference signal.

2. Device according to claim 1, wherein the comparison unit is configured to change from the second signal state to the first signal state when the value of the voltage signal reaches or exceeds the value of the reference signal.

3. Device according to claim 1, wherein the signal generating unit is configured, when the value of the reference signal is exceeded by the voltage signal, to increase the value of the reference signal to a reduced value compared to the value of the voltage signal.

4. Device according to claim 1, wherein the discharge device comprises a series circuit of a resistor unit and a transistor unit.

5. Device according to claim 4, wherein a resistance value of the resistance unit is variable in dependence on the control signal.

6. Device according to claim 4, wherein the transistor unit forms a longitudinal element of a current sink controllable in dependence on the control signal.

7. Device according to claim 6, wherein the current sink comprises an operational amplifier, wherein an output of the operational amplifier is connected to a control terminal of the transistor unit, wherein a first input of the operational amplifier is connected to a reference potential between the resistor unit and the transistor unit, wherein a voltage at a second input of the operational amplifier is variable depending on the control signal.

8. Device according to claim 6, wherein the current sink comprises a voltage regulator unit having a cathode, an anode and a reference terminal, the cathode being connected to a control terminal of the transistor unit and the reference terminal being connected to a potential between the transistor unit and the resistor unit.

9. Device according to claim 6, further comprising a feedback device by means of which a setpoint of the current sink is controlled in dependence on the voltage signal.

10. Device according to claim 4, wherein the transistor unit comprises a plurality of transistors each comprising a control terminal by means of which a current flow between two further terminals of the transistor is controllable, wherein a first terminal of a resistor is connected to a respective resistor unit-side further terminal and second terminals of the resistors are connected together.

11. Power converter for a vehicle, comprising the DC link capacitor and the device for discharging the DC link capacitor according to claim 1.

12. Vehicle comprising at least one power converter according to claim 11.

13. Method of discharging a DC link capacitor, comprising the following steps: generating, by a voltage detection device, a voltage signal describing a capacitor voltage dropping across the DC link capacitor and being represented by a voltage at an output of the voltage detection device; generating, by a signal generating unit, a reference signal having a value at a time of obtaining a discharge signal dependent on the voltage signal and reduced compared to the voltage signal, the signal generation unit comprising an input, an output, a voltage reduction element and an energy storage element, the input being connected to the output of the voltage detecting device, the energy storage element being connected to the output of the signal generation unit, the voltage reducing element being connected to the input of the signal generation unit and in series with the energy storage element, a potential between the voltage reduction element and the energy storage element being connected to the output of the signal generation unit, the energy storage element having a resistor and a capacitor; comparing, by a comparison unit having a first input connected to the output of the voltage detection device and a second input connected to the output of the signal generating unit, the voltage signal present at the first input of the comparison unit with the reference signal present at the second input of the comparison unit; providing, by the comparison unit, a control signal having a first signal state when the discharge signal is received and having a second signal state when the value of the voltage signal equals or falls below the value of the reference signal; and generating a current flow by a discharge device connected in parallel with the DC link capacitor, the current flow having a lower current intensity when the first signal state of the control signal is present than when the second signal state of the control signal is present, wherein a resistance value of the resistor and a capacitance value of the capacitor are chosen such that a value of the reference signal falls more slowly than the value of the voltage signal when discharging the DC link capacitor.

14. A device for discharging a DC link capacitor, comprising:

a discharge device which is connected in parallel with the DC link capacitor and by means of which, on receipt of a discharge signal requesting discharge, a current flow is generated which, in a presence of a first signal state of a control signal, has a lower current intensity than in a presence of a second signal state of the control signal, the discharge device comprising a series circuit of a resistor unit and a transistor unit, the transistor unit forming a longitudinal element of a current sink controllable in dependence on the control signal, the current sink comprising an operational amplifier having a first input, a second input and an output, the first input being connected to a reference potential between the resistor unit and the transistor unit, the output being connected to a control terminal of the transistor unit, a voltage detection device by means of which a voltage signal describing a capacitor voltage dropping across the DC link capacitor is generated, and a control device including:

a signal generating unit which is configured to generate a reference signal having a value at a time of receipt of the discharge signal dependent on the voltage signal and reduced relative to the voltage signal, and a comparison unit which is configured to compare the voltage signal with the reference signal, to provide the control signal with the first signal state when the discharge signal is received, and to provide the control signal with the second signal state when the value of the voltage signal reaches or falls below the value of the reference signal, and a feedback device by means of which a setpoint of the current sink is controlled in dependence on the voltage signal, the feedback device having a current sink controllable as a function of the voltage signal, a voltage at the second input of the operational amplifier being variable by means of the current sink of the feedback device.

* * * * *